(12) United States Patent
Haglof

(10) Patent No.: US 10,267,948 B2
(45) Date of Patent: Apr. 23, 2019

(54) COMPASS WITH LASER POINTER

(71) Applicant: HAGLOF SWEDEN AB, Langsele (SE)

(72) Inventor: Stefan Haglof, Helgum (SE)

(73) Assignee: HAGLOF SWEDEN AB, Langsele (SE)

( * ) Notice: Subject to any disclaimer, the term of this patent is extended or adjusted under 35 U.S.C. 154(b) by 130 days.

(21) Appl. No.: 15/621,246

(22) Filed: Jun. 13, 2017

(65) Prior Publication Data
US 2017/0357028 A1    Dec. 14, 2017

(30) Foreign Application Priority Data
Jun. 14, 2016 (SE) ........................................ 1650829

(51) Int. Cl.
*G01C 17/02* (2006.01)
*G01V 8/10* (2006.01)
*G01C 17/04* (2006.01)

(52) U.S. Cl.
CPC .............. *G01V 8/10* (2013.01); *G01C 17/02* (2013.01); *G01C 17/04* (2013.01)

(58) Field of Classification Search
CPC ...................................................... G01C 17/02
USPC ........................................ 33/348, 355 R, 354
See application file for complete search history.

(56) References Cited

U.S. PATENT DOCUMENTS

| 5,142,788 | A | * | 9/1992 | Willetts | ............... G01C 15/002 33/227 |
| 6,049,989 | A | * | 4/2000 | Lee | ........................ G01C 17/18 33/318 |
| 6,240,649 | B1 | * | 6/2001 | McElroy | .............. G01C 15/002 33/286 |
| 6,243,660 | B1 | * | 6/2001 | Hsu | ........................ G01C 17/30 33/319 |
| 6,701,631 | B1 | | 3/2004 | Monteiro et al. | |
| 2014/0237833 | A1 | * | 8/2014 | Schubert | ................... G01C 9/06 33/365 |
| 2015/0185004 | A1 | * | 7/2015 | Ryoo | ........................ E02D 1/00 33/301 |
| 2015/0377620 | A1 | * | 12/2015 | Heerschap | ............... G01C 9/26 33/301 |
| 2016/0377428 | A1 | * | 12/2016 | Schubert | ................... G01C 9/10 33/366.11 |

FOREIGN PATENT DOCUMENTS

| CN | 203687951 U | 7/2014 |
| GB | 561336 A | 5/1944 |
| SE | 525934 C2 | 5/2005 |

* cited by examiner

*Primary Examiner* — George B Bennett
(74) *Attorney, Agent, or Firm* — Young & Thompson

(57) ABSTRACT

The disclosed instrument includes not only a compass, but also a laser for the emission of a laser beam arranged to define, together with the laser beam, a direction to a point at a distance from the instrument. The compass housing and the laser are mounted in an instrument housing such that the laser is arranged to emit a laser beam parallel to the direction in which the compass is pointing. The compass housing is a separate unit that can be ejected from and inserted into a cavity in the instrument housing from one of its ends. Opposing grooves are arranged in the cavity in order to position the compass housing in the instrument housing. A lock arrangement is present to lock the compass housing fixed in the instrument housing.

4 Claims, 1 Drawing Sheet

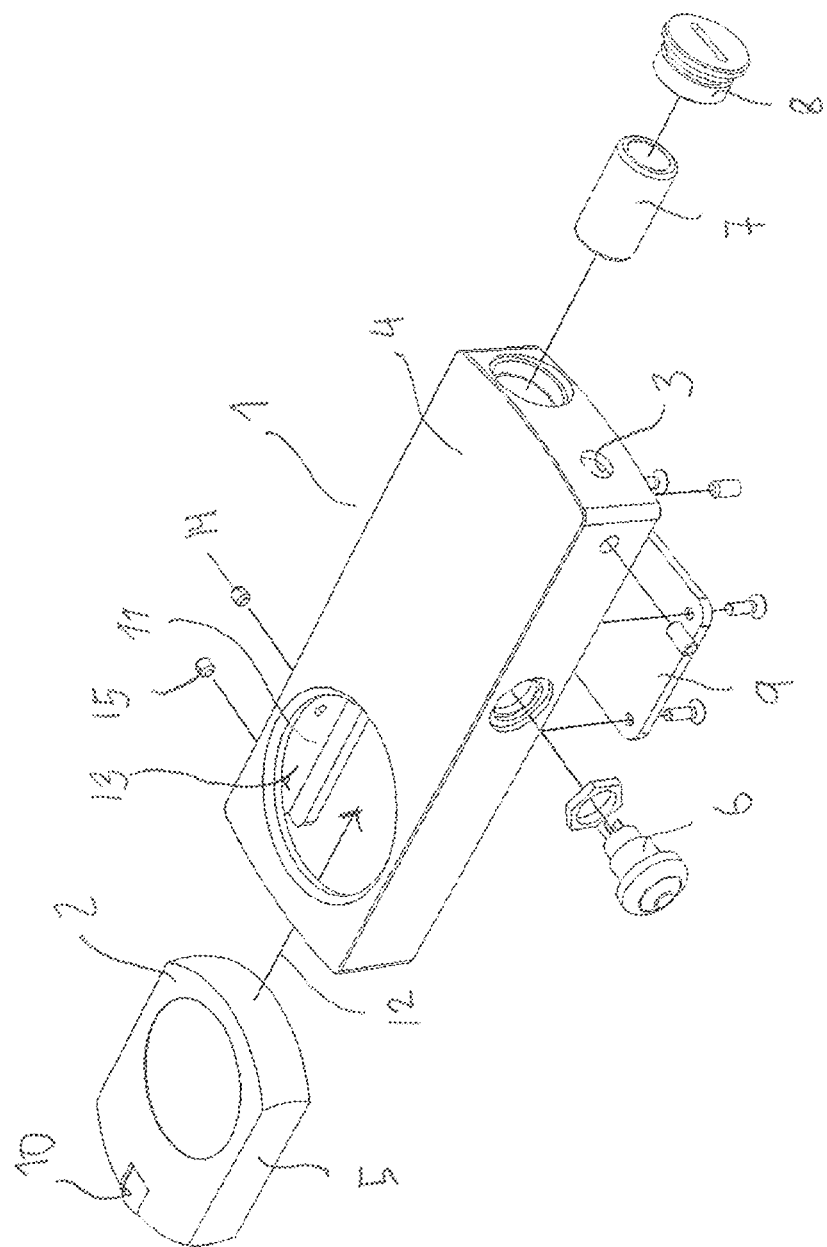

COMPASS WITH LASER POINTER

FIELD OF THE INVENTION

The present invention relates to a compass with a laser pointer.

BACKGROUND OF THE INVENTION

When taking an inventory of forests, borders in the form of boundary lines are determined in order to limit a region within which the inventory work, with respect to the amount of timber and possibly also type of timber, is to take place.

Coordinate points are set out, in order to determine the locations of the boundary lines. When such a point has been found, the position of the subsequent coordinate point must be determined. This takes place through an operator being present at one coordinate point and determining with the aid of a map the direction and distance to the subsequent coordinate point. One person stands at the first coordinate point with an instrument that comprises a compass and a laser pointer. A second person is located in the vicinity of the second coordinate point. The latter person may wear, for example, a high-visibility jacket to ensure high visibility. When the laser beam impinges on the jacket in what is, according to the map, the right direction, the position of the boundary line can be determined and labelled.

The said instrument is prior art technology, and comprises a compass housing with a cover that extends from the upper surface of the compass rose inside the compass housing and downwards parallel to the axis of rotation of the compass. The cover is provided with a scale of 360 degrees or 400 degrees. The compass housing is attached to the housing of the instrument. The cover can be observed through a slit outside of the compass housing, whereby the direction of the compass can be read as a number of degrees.

A green laser is mounted in the housing of the instrument parallel to the direction of the compass, such that when the compass specifies a certain direction a laser beam is projected in the specified direction.

The instrument is used as follows: an operator looks through the said slit with one eye and observes where the laser beam impinges onto an object with the second eye.

The instrument is portable and is not significantly larger than a normal compass.

In order to stake out boundary lines, therefore, it is required that two people gain access to a region of forest, that may, in many cases, be difficult to access.

A major problem with the instrument described is that gas bubbles tend to form in the compass housing. This is normally a consequence of the instrument being exposed to variations in temperature. When bubbles form inside the compass housing, it may no longer be possible to read the scale on the cover with sufficient accuracy to specify the correct compass direction.

In order to correct this, the instrument must be taken to a workshop for the compass housing to be exchanged. In addition to a loss of time, this involves also an unwelcome interruption in the measurements that were to be carried out.

The present invention solves this problem.

SUMMARY OF THE INVENTION

The present invention relates to an instrument comprising not only a compass, but also a laser for the emission of a laser beam arranged to define, together with the laser beam, a direction to a point at a distance from the instrument, where the compass housing and the laser are mounted in an instrument housing such that the laser is arranged to emit a laser beam parallel to the direction in which the compass is pointing, and is characterised in that the compass housing is a separate unit that can be ejected from and inserted into a cavity in the instrument housing from one of its ends, in that opposing grooves are arranged in the cavity in order to position the compass housing in the instrument housing, and in that a lock arrangement is present to lock the compass housing fixed in the instrument housing.

BRIEF DESCRIPTION OF THE DRAWING

The invention will be described in more detail below, partly in association with embodiments given as examples, where FIG. 1 shows an exploded view of an instrument according to the invention.

DETAILED DESCRIPTION OF THE INVENTION

FIG. 1 shows an instrument according to the invention in an exploded view. The instrument 1 comprises not only a compass 2, but also a laser 3 for the emission of a laser beam. The actual laser 3 has the form of a tube and is mounted in the instrument housing 4. The instrument is arranged to define with the laser beam, which is emitted through the opening designated with reference number 3, a direction to a point at a distance from the instrument. The compass housing 5 and the laser 3 are mounted in the instrument housing 4 such that the laser is arranged to emit a laser beam parallel to the direction that the compass demonstrates.

FIG. 1 shows also a switch 6 to switch the laser on and off, a battery 7 and a cover 8. A cover 9 is present that covers a compartment for the electronic circuits of the laser.

The compass housing 5 has the said slit 10 through which the compass rose 11 of the compass housing on the said cover can be read with respect to the current number of degrees.

According to the invention, the compass housing 5 is a separate unit that can be ejected from and inserted into a cavity 11 in the instrument housing 4 from one of its ends, as shown by the arrow 12. The internal dimensions of the cavity correspond to the external dimensions of the compass housing.

Opposing grooves 13, of which only one can be seen in FIG. 1, are present arranged in the cavity 11 in order to position the compass housing 5 in the instrument housing 4. A lock arrangement 14, 15 is present in order to lock the compass housing 5 fixed in the instrument housing 4.

According to one preferred design, the laser is a green laser with a power of approximately 1 mW. It had proved to be the case that a green laser is easier to see than a red laser. The prior art instrument uses a red laser.

It is preferred that the said locking means 14, 15 comprise a screw that acts through the instrument housing 4 and directly against the separate unit 5.

When a compass housing contains bubbles, it is very easy to loosen the two screws 14, 15 and to withdraw the compass housing 5 from the instrument housing 4, insert a second compass housing 5 into the instrument housing 4 and tighten the screws. It is preferable that the personnel carry with them one or several additional compass housings. This means that the measurements can continue even if the instrument that is being used can no longer be used.

It is appropriate that at least one of the compass housing and the instrument housing be manufactured from a plastic material or from aluminium, in order that the instrument obtain a low weight.

A number of embodiments have been described above. The present invention, however, is not to be considered to be limited to the said embodiments: it can be varied within the framework specified by the attached patent claims.

The invention claimed is:

1. An instrument comprising not only a compass (2), but also a laser (3) for the emission of a laser beam arranged to define, together with the laser beam, a direction to a point at a distance from the instrument, where the compass housing (5) and the laser (3) are mounted in an instrument housing (4) such that the laser is arranged to emit a laser beam parallel to the direction in which the compass is pointing, wherein the compass housing (5) is a separate unit that can be ejected from and inserted into a cavity (11) in the instrument housing (4) from one of its ends, wherein opposing grooves (13) are arranged in the cavity (11) in order to position the compass housing (5) in the instrument housing, and wherein a lock arrangement (14, 15) is present to lock the compass housing fixed in the instrument housing.

2. The instrument according to claim 1, wherein the laser (3) is a green laser with a power of approximately 1 mW.

3. The instrument according to claim 1, wherein the lock arrangement comprises a screw (14, 15) that acts through the instrument housing (4) and directly onto the compass housing (5).

4. The instrument according to claim 2, wherein the lock arrangement comprises a screw (14, 15) that acts through the instrument housing (4) and directly onto the compass housing (5).

* * * * *